United States Patent [19]
Juneau

[11] Patent Number: 5,100,716
[45] Date of Patent: Mar. 31, 1992

[54] OUTDOOR FLOOR COVERING

[75] Inventor: Gérard Juneau, St-Bruno-de-Montarville, Canada

[73] Assignee: Gestion Naurin Inc., Montreal, Canada

[21] Appl. No.: 453,922

[22] Filed: Dec. 20, 1989

[51] Int. Cl.⁵ .................. B32B 3/28; A47G 9/06
[52] U.S. Cl. .................. 428/167; 428/172; 428/215; 428/218; 428/318.4; 428/318.6; 428/493; 5/417
[58] Field of Search ........... 428/156, 158, 163, 167, 428/172, 318.4, 119, 120, 213, 215, 218, 304.4, 318.6, 493; 5/417

[56] References Cited

U.S. PATENT DOCUMENTS

| | | | |
|---|---|---|---|
| 1,580,075 | 4/1926 | Paine | 428/167 |
| 2,069,720 | 2/1937 | Harvey | 428/167 |
| 3,711,362 | 8/1971 | Ballard | 428/167 |
| 3,787,259 | 1/1974 | Kleinfeld | 428/85 |
| 4,122,224 | 10/1978 | Brewer | 428/142 |

*Primary Examiner*—Ellis P. Robinson
*Assistant Examiner*—Donald J. Loney

[57] ABSTRACT

An outdoor floor covering comprised of two laminated sheets of flexible water-resistant materials. A top one of the sheets has a low-profile ribbed outer surface and is comprised of a material capable of retaining flexible properties at low temperatures well below freezing. The other sheet is a backing sheet formed of a closed cell material having a density which is much weaker than that of the top sheet so that the backing sheet is impermeable and deforms under the force of a small load exerted on the top sheet whereby any ice formed on the top sheet can be easily broken by the deformation of the top sheet caused by a person standing on the floor covering. The backing sheet also has a thickness which is at least three times that of the top sheet.

4 Claims, 1 Drawing Sheet

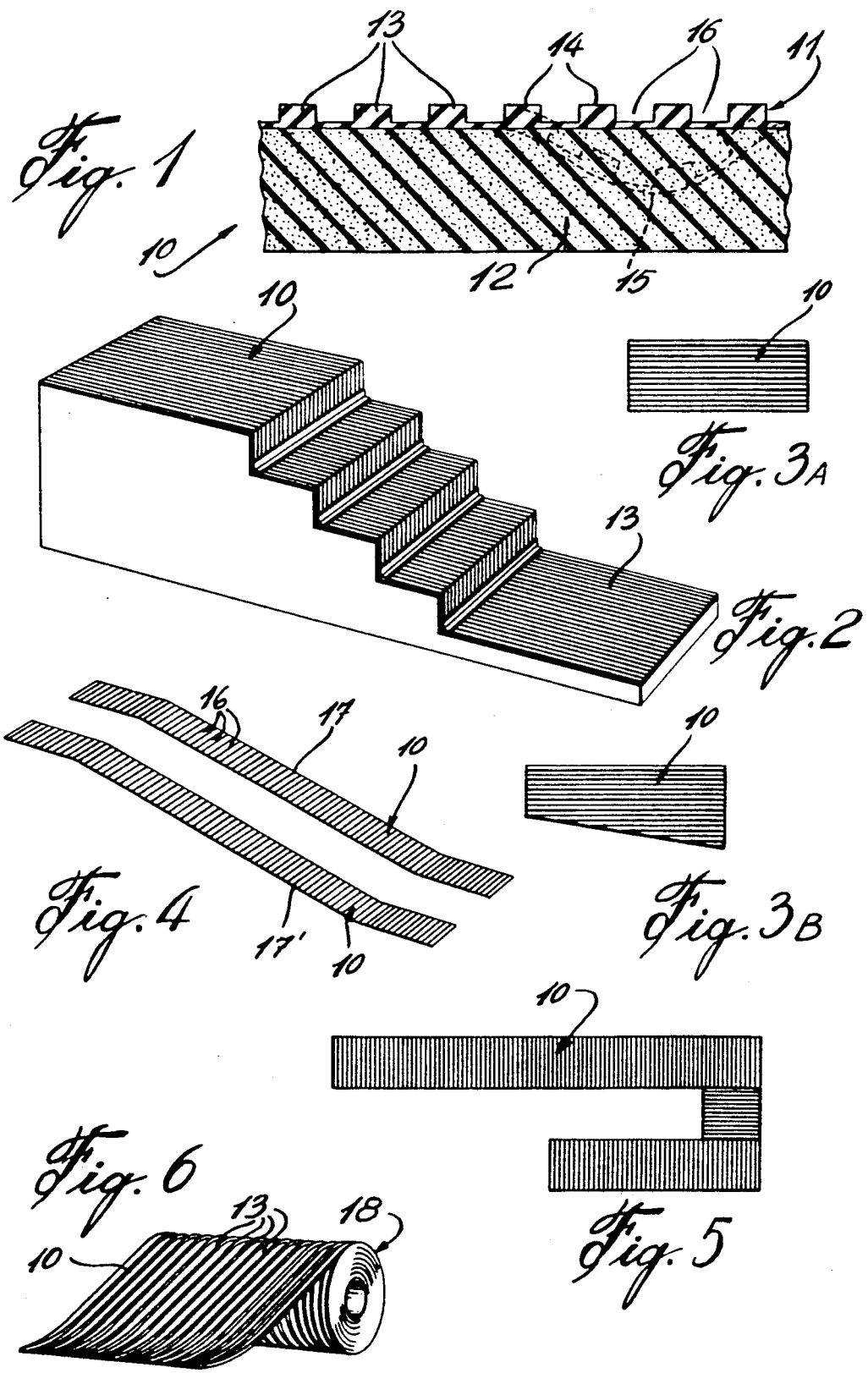

OUTDOOR FLOOR COVERING

BACKGROUND OF INVENTION

1. Field of Invention

The present invention relates to an improved floor covering material and one on which ice can be easily broken and sweept away without the use of special implements, such as shovels, ices, salts, etc., but rather by the weight of a person standing on the sheet and more particularly, wherein the floor covering deforms under the load of a person standing thereon.

2. Description of Prior Art

Many types of outdoor floor covering are known to render them non-slippery and easy to clean. However, known outdoor floor covering are usually comprised of a single sheet or laminated sheet of non-deformeable material for positioning on a hard backing surface. Accordingly, when ice forms on the floor covering, it is essential to chip it away in order to break it and this damages the covering. Also, many known outdoor floor covering surfaces are constructed of material which in fact retain ice formed thereon either due to the pattern of its top surface or else by the material itself, such as fiber type floor coverings. With such coverings, it is next to impossible to remove any ice formed thereon thereby rendering the surface slippery and hazardous.

SUMMARY OF INVENTION

It is a feature of the present invention to provide an outdoor floor covering which substantially overcome the above disadvantages of the prior art.

It is a further feature of the present invention to provide an outdoor floor covering comprised of two laminated sheets of flexible water-resistant material and wherein the top sheet is comprised of a rubber-like substance and the back sheet of a closed cell foam substance which is much thicker than the top sheet and which deforms when the load of a person stands thereon thereby breaking ice which may have been formed on the top sheet.

Another feature of the present invention is to provide an outdoor floor covering wherein the top one of the laminated sheets is provided with a low-profile rib surface, and which is easy to install and has multiple usages.

According to the above features, from a broad aspect, the present invention provides an outdoor floor covering comprised of two laminated sheets of flexible water-resistant materials. A top one of the sheets has a low-profile ribbed outer surface and is comprised of a material capable of retaining flexible properties at low temperatures well below freezing. The other other sheet is a backing sheet formed of a closed cell material having a density which is much weaker than that of the top sheet so that the backing sheet is impermeable and deforms under the force of a small load exerted on the top sheet whereby any ice formed on the top sheet can be easily broken by a person standing on the floor covering. The backing sheet also has a thickness which is at least three times that of the top sheet.

BRIEF DESCRIPTION OF DRAWINGS

A preferred embodiment of the present invention will now be described with reference to the accompanying drawings, in which FIG. 1 is a cross-section view of the outdoor floor covering of the present invention;

FIG. 2 is a perspective view showing the outdoor floor covering of the present invention as glued or otherwise attached to a stairwell having a landing on a balcony;

FIGS. 3A and 3B are plan views showing the outdoor floor covering of the present invention as secured to stairs having different outlines;

FIG. 4 is a perspective view showing the outdoor floor covering of the present invention as utilized on an inclined driveway;

FIG. 5 is a plan view showing the outdoor floor covering of the present invention as applied to an access ramp, and FIG. 6 is a perspective view showing the outdoor floor covering of the present invention in a roll form.

DESCRIPTION OF PREFERRED EMBODIMENTS

Referring now to the drawings, and more particularly to FIG. 1, there is shown generally at 10 the outdoor floor covering of the present invention as comprised of two laminated sheets of flexible water-resistant materials bonded together by suitable bonding means such as glue or fusing. The top one of the sheet, namely sheet 11 is formed of galvanized rubber or like material which has a high density to prevent puncture thereof under a concentrated load exerted thereon such as by the heel of a ladies shoe. The backing layer 12 is comprised of a foam rubber which is non-absorbent and which remains flexible at low temperatures. It is a closed cell material exhibiting a density which is much weaker than that of the top sheet so that the backing will deform under the force of a small load exerted on the top sheet such as by a person's weight.

Preferably, the backing sheet 12 has a thickness which is at least three times that of the total thickness of the top sheet. As can be seen, the top sheet has a ribbed outer surface which is comprised of space-apart elongated low-profile ribs 13 which have a flat top surface 14 to provide good adhesion with a person's footwear to prevent slipping when ice forms on the top sheet.

If ice is formed on the top sheet, it can be easily broken by the deformation exerted by the load of a person standing on it or by using other means of deformation. Such deformation is for example, illustrated at 15 and under such action, any ice surface will break into small pieces and can then be easily swept away by brooming the surface in the direction of the channels 16 formed between the ribs 13.

In a preferred embodiment, the thickness of the top sheet 11 less than three millimeters and the backing material has a thickness of at least 10 millimeters so that the laminated structure can deform under a light load exerted by a person standing on the covering without causing discomfort to the person by having a sensation of "sinking" into the covering. Also, these materials must have properties to resist heavy loads such as by vehicles which may be displaced over the surface.

Some of the uses of the present invention are now illustrated by the of its applications as shown in FIGS. 2 to 5. FIG. 2 shows the outdoor floor covering of the present invention as utilized on a stairwell. As herein shown the ribs 13 are disposed along the long axis of the stairwell. This is to make it more comfortable to a person walking on that surface. Also, when cleaning that surface, it must be broomed along the horizontal axis so that debris are not swept to each side. Accordingly, the ribs also make it easier to gather debris at the foot of each stair of the staircase.

FIGS. 3A and 3B show that the product of the present invention is adaptable to stairs of any configuration. All one needs to do is to cut the material with a sharp knife along the delineated edges of the stair.

FIG. 4 shows the use of the outdoor floor covering 10 in two parallel rows 17 and 17' of a driveway formed on an inclined, either an upward inclined or downward inclined. By locating the ribs 16 transverse in the direction of travel of the vehicle, it can be appreciated that ice will break away quickly under the weight of a vehicle whereby the ribs become exposed to provide better traction and also provide ease of removal of the broken ice. For example, these tracks 17 and 17' may be 18 inches wide to provide enough tolerance to the driver of the automobile. It is also pointed out that snow will not adhere to the top rubber surface.

FIG. 5 shows another use of the outdoor floor covering of the present invention as glued on an inclined access ramp. This also provides excellent traction for handicap people who displaced themselves in wheel chairs.

In FIG. 6 there is shown a roll 18 of the floor covering 10 of the present invention which has been extruded with the ribs 13 extending longitudinally thereon. Accordingly, the outdoor carpet can be sold in a roll form and the user can cut individual pieces of different sizes from the floor covering to adapt it to his own use. There are multitude of other uses not disclosed herein, such as for covering the flooring of trucks, particularly trucks with open boxes whereby to facilitate cleaning and ice removal therefrom. It is also pointed that the formation of ice on such surfaces could become hazardous to merchandise transported thereon, as the merchandise can easily shift on a slippery support surface and could become extremely hazardous when transported on a roadway.

It is within the ambit of the present invention to cover any other obvious modifications of the preferred embodiment described therein, provided such modifications fall within the scope of the appended claims.

I claim:

1. An outdoor floor covering comprising two laminated sheets of flexible water-resistant material; a top one of said sheets having a low-profile ribbed outer surface and being formed of galvanized rubber having a high density to prevent puncture under a concentrated load said top one of said sheets being a flexible sheet capable of retaining flexible properties throughout low temperatures well below freezing; and a backing sheet formed of a closed cell material having a density which is much weaker than that of said top sheet so that said backing sheet is impermeable and deforms under the force of a small load exerted on said top sheet whereby any ice formed on said top sheet can be easily broken by a person standing on said floor covering which deforms said top and backing sheets, said top and bottom sheets reassuming its original form when said load is removed from said top sheet, said backing sheet having a thickness which is at least three times that of said top sheet.

2. A floor covering as claimed in claim 1 wherein said ribbed outer surface is comprised of spaced-apart, low-profile, elongated ribs having a flat top and defining channels therebetween for the accumulation of foreign material.

3. A floor covering as claimed in claim 2 wherein said backing material is a foam rubber which is non-liquid absorbent and which remains flexible at said low temperature.

4. A floor covering as claimed in claim 3 wherein said top sheet has a thickness of at least 3 mm., said backing sheet having a thickness higher than 10 mm.

* * * * *